United States Patent [19]
Bosso et al.

[11] 3,839,252
[45] Oct. 1, 1974

[54] QUATERNARY AMMONIUM EPOXY RESIN DISPERSION WITH BORIC ACID FOR CATIONIC ELECTRO-DEPOSITION

[75] Inventors: Joseph F. Bosso; Lomer Burrell; Marco Wismer, all of Gibsonia, Pa.

[73] Assignee: PPG Industries, Inc., Pittsburgh, Pa.

[22] Filed: Aug. 1, 1972

[21] Appl. No.: 277,007

Related U.S. Application Data

[60] Division of Ser. No. 167,470, July 29, 1971, , which is a continuation-in-part of Ser. Nos. 840,847, July 10, 1969, abandoned, and Ser. No. 840,848, July 10, 1969, abandoned, and Ser. No. 100,825, Dec. 22, 1970, abandoned, and Ser. No. 100,834, Dec. 22, 1970, abandoned, said Ser. No. 100,825, and Ser. No. 100,834, each is a continuation-in-part of Ser. No. 56,730, July 20, 1970, abandoned, which is a continuation-in-part of Ser. No. 772,366, Oct. 31, 1968, abandoned.

[52] U.S. Cl......... 260/29.2 EP, 204/181, 260/2 EC, 260/18 EP, 260/47 EC
[51] Int. Cl... C08b 13/00, C08g 30/16, C08g 51/24
[58] Field of Search ...... 260/29.2 BP, 2 EC, 47 EC, 260/29.2 EP

[56] References Cited
UNITED STATES PATENTS

| | | | |
|---|---|---|---|
| 2,676,166 | 4/1954 | Webers | 260/2 EP |
| 2,909,448 | 10/1959 | Schroeder | 260/29.2 EP |
| 2,928,809 | 5/1960 | Hicks | 260/2 EC |
| 3,102,873 | 9/1963 | Lee | 260/47 EC |
| 3,134,754 | 5/1964 | Brunner et al. | 260/47 EC |
| 3,257,347 | 6/1966 | Woods et al. | 260/29.2 EP |
| 3,301,804 | 1/1967 | Zora et al. | 260/29.2 EP |
| 3,336,253 | 8/1967 | Wong et al. | 260/29.2 EP |
| 3,395,107 | 7/1968 | Burnthall et al. | 260/29.2 EP |
| 3,449,281 | 6/1969 | Sullivan et al. | 260/29.2 EP |
| 3,619,398 | 11/1971 | Bosso et al. | 260/29.2 EP |
| 3,632,559 | 1/1972 | Matter et al. | 260/29.2 EP |
| 3,702,351 | 11/1972 | Tesson et al. | 260/29.2 EP |
| 3,715,335 | 2/1973 | Bagskai | 260/29.2 EP |

*Primary Examiner*—Murray Tillman
*Assistant Examiner*—A. H. Koeckert
*Attorney, Agent, or Firm*—Carl T. Severini

[57] ABSTRACT

Synthetic resins which are water-dispersible epoxy resins having epoxy groups, chemically-bound quaternary ammonium base salts, can be dissolved or dispersed in water to provide aqueous coating compositions. Such compositions, in which these resins are the major resinous component, can be applied by electrodeposition and deposit on the cathode to provide coatings of improved properties, including a high degree of resistance to corrosion or staining.

24 Claims, No Drawings

QUATERNARY AMMONIUM EPOXY RESIN DISPERSION WITH BORIC ACID FOR CATIONIC ELECTRO-DEPOSITION

CROSS-REFERENCES TO RELATED APPLICATIONS

This application is a division of copending U.S. Application Ser. No. 167,470, filed July 29, 1971, which in turn is a continuation-in-part of copending U.S. Applications Ser. Nos. 840,847 and 840,848, filed July 10, 1969 now abandoned, and also a continuation-in-part of copending U.S. Applications Ser. Nos. 100,825 and 100,834, filed Dec. 22, 1970 now abandoned, both of which, in turn, are continuations-in-part of copending U.S. Applications Ser. No. 56,730, filed July 20, 1970 now abandoned, which is a continuation-in-part of copending U.S. Application Ser. No. 772,366, filed Oct. 31, 1968 now abandoned.

BACKGROUND OF THE INVENTION

Electrodeposition, although known for some time, has only recently become of commercial importance as a coating application method. Along with the increased use of such methods has been the development of certain compositions which can provide satisfactory coatings when applied in this manner. While many compositions can be electrodeposited, most coating compositions when applied using electrodeposition techniques do not produce commercially usable coatings. Moreover, electrodeposition of many coating materials, even when otherwise successful, is attended by various disadvantages such as non-uniform coatings and by poor throwing power. In addition, the coatings obtained are in most instances deficient in certain properties essential for their utilization in many applications for which electrodeposition is otherwise suited. In particular, properties such as corrosion resistance and alkali resistance are difficult to achieve with the resins conventionally employed in electrodeposition processes. This is especially true with the conventional electrodeposition vehicles, which contain polycarboxylic acid resins solubilized with a base; these deposit on the anode and because of their acidic nature tend to be sensitive to common types of corrosive attack, e.g., by salt, alkali, etc. Many electrodeposited anodic coatings are subject to discoloration or staining because of dissolution of metal ions at the anode.

Epoxy resins are among the most useful resins for many purposes and have excellent corrosion resistance and other properties. They are employed in many coatings, but have not been employed in water-dispersible compositions suitable for application by electrodeposition because they cannot be adequately dispersed in water under the conditions required in such processes. Esterified epoxies have been utilized, but these act similarly to the polycarboxylic acid resins, and while offering many advantages over such polycarboxylic acid resins, are still subject to many of their disadvantages.

In copending Application Ser. No. 772,353, filed on Oct. 31, 1968 now U.S. Pat. No. 3,619,398, there are described certain water-dispersed epoxy compositions which can be electrodeposited with good results. These compositions are typically stable emulsions and although they are very useful and provide highly desirable coatings they are still subject to certain disadvantages, such as low throwing power and difficulty in controlling film thickness, attributed to the hydrophobic nature of the epoxy reaction products therein.

In copending application Ser. No. 100,834, filed Dec. 22, 1970, now abandoned there are disclosed cathodic electrodepositable epoxy resins containing epoxy groups, quaternary ammonium salts, boron and oxyalkylene groups and aqueous dispersions thereof.

SUMMARY OF THE INVENTION

It has now been found that synthetic resins which are ungelled water-dispersible epoxy resins having epoxy groups and chemically-bound quaternary ammonium base groups can be easily utilized to provide clear or colloidal water solutions. "Chemically-bound", as utilized herein, includes salts as well as covalent bonding. These compositions, when solubilized with an acid having a dissociation constant greater than about $1 \times 10^{-5}$, can be applied by electrodeposition to provide adherent coatings having excellent properties. When electrodeposited, they deposit on the cathode. When employed in aqueous compositions for electrodeposition, the above resins form the major resinous constituent of the composition, either as the sole resinous component or along with one or more other resinous or film-forming materials. Among the properties of the coatings herein are the desirable properties ordinarily associated with electrodepositable resins known heretofore and, in addition, these reaction products provide coatings of unique advantages and properties. These include a high level of resistance to salt spray, alkali and similarly corrosive elements, even over unprimed metals and in the absence of corrosive-inhibiting pigments, and are resistant to staining and discoloration which is often encountered with electrodeposited coatings based on anodic-type resins. These resins, when solubilized with an acid having a dissociation constant greater than $1 \times 10^{-5}$ have appreciably higher throw power and better film-forming characteristics than in similar compositions, for example, those described in U.S. Pat. No. 3,301,804.

DETAILED DESCRIPTION OF THE INVENTION

The resins of the invention are ungelled, water-dispersible epoxy resins having in their molecule at least one 1,2-epoxy group per average molecule and containing chemically-bound quaternary ammonium base salts, the quaternary ammonium base salts being salts of boric acid and/or an acid having a dissociation constant greater than boric acid, including organic and inorganic acids. Upon solubilization, at least a portion of the salt must be a salt of an acid having a dissociation constant greater than about $1 \times 10^{-5}$. Preferably the acid is an organic, carboxylic acid. The presently preferred acid is lactic acid. Preferably the resin contains from about 0.05 to about 16 percent by weight nitrogen and at least about 1 percent of said nitrogen and preferably about 20 percent, more preferably about 50 percent, and most preferably, substantially all, of the nitrogen being in the form of chemically-bound quaternary ammonium base salt groups; preferably the remainder of said nitrogen being in the form of amino nitrogen.

The epoxy compound can be any monomeric or polymeric compound or mixture of compounds having a 1,2-epoxy equivalency greater than 1.0, that is, in which the average number of 1,2-epoxy groups per molecule is greater than 1. It is preferred that the epoxy compound be resinous, that is, a polyepoxide, i.e., containing more than one epoxy group per molecule. The polyepoxide can be any of the well-known epoxides, provided it contains sufficient epoxy groups so that some residual epoxy groups remain in the product after the oxyalkylation for reaction with the amine compound described hereinafter. Examples of these polyepoxides have, for example, been described in U.S. Pat. Nos. 2,467,171; 2,615,007; 2,716,123; 3,030,336; 3,053,855 and 3,075,999. A useful class of polyepoxides are the polyglycidyl ethers of polyphenols, such as Bisphenol A. These may be produced, for example, by etherification of a polyphenol with epichlorohydrin or dichlorohydrin in the presence of an alkali. The phenolic compound may be bis(4-hydroxyphenyl)-2,2-propane, 4,4'-dihydroxybenzophenone, bis(4-hydroxyphenyl)1,1-ethane, bis(4-hydroxyphenyl)1,1-isobutane; bis(4-hydroxytertiary-butylphenyl)2,2-propane, bis(2-hydroxynaphthyl)methane, 1,5-dihydroxynaphthalene, or the like. Another quite useful class of polyepoxides are produced similarly from novolak resins or similar polyphenol resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, bis(4-hydroxycyclohexyl)-2,2-propane, and the like.

There can also be used polyglycidyl esters of polycarboxylic acids which are produced by the reaction of epichlorohydrin or a similar epoxy compound with an aliphatic or aromatic polycarboxylic acid, such as oxalic acid, succinic acid, glutaric acid, terephthalic acid, 2,6-naphthylene dicarboxylic acid, dimerized linolenic acid, and the like. Examples are diglycidyl adipate and diglycidyl phthalate.

Also useful are polyepoxides derived from the epoxidation of an olefinically unsaturated alicyclic compound. Included are diepoxides comprising in part one or more monoepoxides. These polyepoxides are non-phenolic and are obtained by epoxidation of alicyclic olefins, for example, by oxygen and selected metal catalysts, by perbenzoic acid, by acetaldehyde monoperacetate, or by peracetic acid. Among such polyepoxides are the epoxyalicyclic ethers and esters, which are well known in the art.

Another class of polyepoxides are those containing oxyalkylene groups in the epoxy molecule. such oxyalkylene groups are typically groups of the general formula:

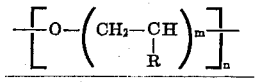

where R is hydrogen or alkyl, preferably lower alkyl (e.g., having 1 to 6 carbon atoms) and where, in most instances, $m$ is 1 to 4 and $n$ is 2 to 50. Such groups can be pendent to the main molecular chain of the polyepoxide or part of the main chain itself. The proportion of the oxyalkylene groups in the polyepoxide depends upon many factors, including the chain length of the oxyalkylene group, the nature of the epoxy and the degree of water solubility desired. Usually the epoxy contains at least about 1 percent by weight or more, and preferably 5 percent or more, of oxyalkylene groups.

Some polyepoxides containing oxyalkylene groups are produced by reacting some of the epoxy groups of a polyepoxide, such as the epoxy resins mentioned above, with a monohydric alcohol containing oxyalkylene groups. Such monohydric alcohols are conveniently produced by oxyalkylating an alcohol, such as methanol, ethanol, or other alkanol, with alkylene oxide. Ethylene oxide, 1,2-propylene oxide and 1,2-butylene oxide are especially useful alkylene oxides. Other monohydric alcohols can be, for example, the commercially available materials known as Cellosolves and Carbitols, which are monoalkyl ethers of polyalkylene glycols. The reaction of the monohydric alcohol and the polyepoxide is generally carried out in the presence of a catalyst; formic acid, dimethylethanolamine, diethylethanolamine, N,N-dimethylbenzylamine and, in some cases, stannous chloride are useful for this purpose.

Similar polyepoxides containing oxyalkylene groups can be produced by oxyalkylating the epoxy resin by other means, such as by direct reaction with an alkylene oxide.

The polyepoxide employed to produce the foregoing epoxies containing oxyalkylene groups should contain a sufficient number of epoxy groups so that the average number of residual epoxy groups per moleucle remaining in the product after the oxyalkylation is greater than 1.0. Where oxyalkylene groups are present, the epoxy resin preferably contains from about 1.0 to about 90 percent or more by weight of oxyalkylene groups.

Other epoxy-containing compounds and resins include nitrogeneous diepoxides such as disclosed in U.S. Pat. No. 3,365,471; epoxy resins from 1,1-methylene bis(5-substituted hydantoin), U.S. Pat. No. 3,391,097; bis-imide containing diepoxides, U.S. Pat. No. 3,450,711, epoxylated aminomethyl diphenyl oxides, U.S. Pat. No. 3,312,664; heterocyclic N,N'-diglycidyl compounds, U.S. Pat. No. 3,503,979; amino epoxy phosphonates, British Pat. 1,172,916; 1,3,5-triglycidyl isocyanurates, as well as other epoxy-containing materials known in the art.

The resins of the invention are formed by reacting the epoxy compound with an amine salt to form quaternary amine base group-containing resins.

Examples of salts which may be employed include salts of ammonia, primary, secondary or tertiary amines, and preferably tertiary amines; salts of boric acid or an acid having a dissociation constant greater than that of boric acid and preferably an organic acid having a dissociation constant greater than about $1 \times 10^{-5}$. The presently preferred acid is lactic acid. Such acids include, lactic acid, acetic acid, propionic acid, butyric acid, hydrochloric acid, phosphoric acid, sulfuric acid. The amines may be unsubstituted amines or amines substituted with non-reactive constituents such as halogens or hydroxylamines. Specific amines include dimethylethanolamine salts of boric, lactic, propionic, butyric, hydrochloric, phosphoric and sulfuric or similar salts of triethylamine, diethylethanolamine, trimethylamine, diethylamine, dipropylamine, 1-amino-2-propanol, and the like. Also includes are ammonium borate, ammonium lactate, ammonium acetate, ammonium chloride, ammonium phosphate, as well as other amine and ammonium salts as defined above.

A distinct class of amine compounds within the broader class is amine containing one or more secondary or tertiary amino groups and at least one hydroxyl group.

In most cases the hydroxyl amine employed corresponds to the general formula:

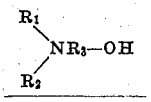

where $R_1$ and $R_2$ are, preferably, methyl, ethyl, or lower alkyl groups, but can be essentially any other organic radical, so long as they do not interfere with the desired reaction. Benzyl, alkoxyalkyl, and the like are examples. $R_1$ can also be hydrogen. The nature of the particular groups is less important than the presence of a secondary or tertiary amino nitrogen atom, and thus higher alkyl, aryl, alkaryl, aralkyl, and substituted groups of the types can be present. The group represented by $R_3$ is a divalent organic group, such as alkylene or substituted-alkylene, e.g., oxyalkylene or poly(oxyalkylene), or, less desirably, arylene, alkarylene or substituted arylene. $R_3$ can also be an unsaturated group, e.g., an alkylene group such as —CH=CH— or

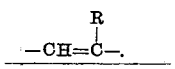

Other groups represented by $R_3$ include cyclic or aromatic groups; one type of useful amine, for instance, is represented by the formula:

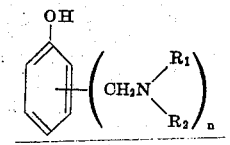

where $n$ is 1 to 3. Dialkanolamines, of the general formula $R_1N(R_3OH)_2$, and trialkanolamines, of the general formula $N(R_3OH)_3$, are also useful.

Some examples of specific amines are as follows:
dimethylethanolamine
dimethylpropanolamine
dimethylisopropanolamine
dimethylbutanolamine
diethylethanolamine
ethylethanolamine
methylethanolamine
N-benzylethanolamine
diethanolamine
triethanolamine
dimethylaminomethyl phenol
tris(dimethylaminomethyl)phenol
2-[2-(dimethylamino)ethoxy]ethanol
1-[1-(dimethylamino)-2-propoxy]-2-propanol
2-(2-[2(dimethylamino)ethoxy]ethoxy)ethanol
1-[2-(dimethylamino)ethoxy]-2-propanol
1-(1-[dimethylamino]-2-propoxy]-2-propoxy)-2-propanol Another distinct class of amine compound within the broader class is any amine containing one or more secondary or tertiary amino groups and at least one terminal carboxyl group. In most cases where a carboxyl amine is employed, it corresponds to the general formula:

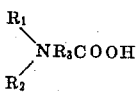

where $R_1$ and $R_2$ are each preferably methyl, ethyl, or other lower alkyl groups, but can be essentially any other organic radical, so long as they do not interfere with the desired reaction. Benzyl, alkoxyalkyl, and the like are examples. $R_1$ can also be hydrogen. The nature of the particular groups is less important than the presence of a secondary or tertiary amino nitrogen atom, and thus higher alkyl, aryl, alkaryl, aralkyl, and substituted groups of these types can be present. The group represented by $R_3$ is a divalent organic group, such as alkylene or substituted alkylene, e.g., oxyalkylene or poly(oxyalkylene), or, less desirably, arylene, alkarylene or substituted arylene. $R_3$ can also be an unsaturated group, e.g., an alkenylene group.

Such amines can be prepared by known methods. For example, an acid anhydride, such as succinic anhydride, phthalic anhydride or maleic anhydride, can be reacted with an alkanolamine, such as dimethylethanolamine or methyldiethanolamine; the group represented by $R_3$ in the amines produced in such cases contain ester groups. Other types of amines are provided, for example, by reacting an alkylamine with an alkyl acrylate or methacrylates such as methyl or ethyl acrylate or methacrylate as described in U.S. Pat. No. 3,419,525. Preferably the ester group is subsequently hydrolyzed to form a free carboxyl group. Other methods for producing amines of different types can also be employed.

It can be seen that the groups represented by $R_3$ can be of widely varying types; some examples are:
— R' —
— R'OCOR' —
—(R'O)$_n$COR' — where each R' is alkylene, such as —CH$_2$CH$_2$—,

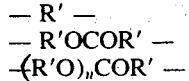

etc., or alkenylene, such as 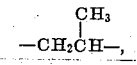, and n is 2 to 10 or higher. Other groups represented by R' include cyclic or aromatic groups.

Some examples of specific amines are as follows:
N,N-dimethylaminoethyl hydrogen maleate
N,N-diethylaminoethyl hydrogen maleate
N,N-dimethylaminoethyl hydrogen succinate
N,N-dimethylaminoethyl hydrogen phthalate
N,N-dimethylaminoethyl hydrogen hexahydrophthalate
2-(2-dimethylaminoethoxy)ethyl hydrogen maleate
1-methyl-2-(2-dimethylaminoethoxy)ethyl hydrogen maleate
2-(2-dimethylaminoethoxy)ethyl hydrogen succinate
1,1-dimethyl-2-(2-dimethylaminoethoxy)ethyl hydrogen succinate
2-[2-(2-dimethylaminoethoxy)ethoxy]ethyl hydrogen maleate
beta-(dimethylamino)propionic acid
beta-(dimethylamino)isobutyric acid
beta-(diethylamino)propionic acid
1-methyl-2-(dimethylamino)ethyl hydrogen maleate 2-(methylamino)ethyl hydrogen succinate
3-(ethylamino)propyl hydrogen maleate
2[2-(dimethylamino)ethoxy]ethyl hydrogen adipate N,N-dimethylaminoethyl hydrogen azelate di-(N,N-dimethylaminoethyl)hydrogen tricarballylate N,N-dimethylaminoethyl hydrogen itaconate 1-(1-[1(dimethylamino)-2-propoxy]-2-propoxy)-2-propyl hydrogen maleate 2-[2-(2-(dimethylamino)ethoxy]ethoxy]ethoxy]ethyl hydrogen succinate In one embodiment, the epoxy compounds described above may be reacted with an ester of boric acid or a compound which can be cleaved to form boric acid in a medium containing water and preferably an amino containing boron ester and/or a tertiary amine salt of boric acid to produce the epoxy reaction products of the invention. The boron compound component utilized in producing the reaction products can be, for example, any triorganoborate in which at least one of the organic groups is substituted with an amino group. Structurally, such esters are esters of boric acid or a dehydrated boric acid such as metaboric acid and tetraboric acid, although not necessarily produced from such acids. In most cases the boron esters employed correspond to one of the general formulas:

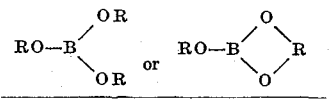

where the R groups are the same or different organic groups. The groups represented by R above can be virtually any organic group, such as hydrocarbon or substituted hydrocarbon, usually having not more than 20 carbon atoms and preferably not more than about 8 carbon atoms. The preferred esters have alkyl groups or polyoxyalkyl groups. At least one of the organic groups contains an amine group, i.e., a group of the structure:

where $R_1$ and $R_2$ are hydrogen or preferably, methyl, ethyl or other lower alkyl groups, but can be essentially any other organic radical, so long as they do not interfere with the desired reaction. The nature of the particular groups is less important than the presence of an amino nitrogen atom, and thus higher alkyl, aryl, alkaryl, aralkyl and substituted groups of these types can be present. While both $R_1$ and $R_2$ can be hydrogen (i.e., the amino group is a primary amino group), it is preferred that at least one be an alkyl or other organic group, so that the amino group is a secondary or tertiary.

The preferred boron esters correspond to the formula:

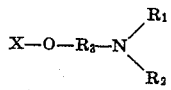

where X has the structure:

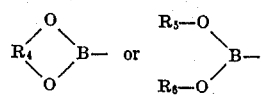

$R_3$ and $R_4$ being divalent organic radicals, such as alkylene or substituted-alkylene, e.g., oxyalkylene or poly-(oxyalkylene), or, less desirably, arylene, alkarylene or substituted arylene. $R_5$ and $R_6$ can be alkyl, substituted alkyl, aryl, alkaryl, or other residue from essentially any monohydroxy alcohol derived by removal of the hydroxyl group. $R_5$ and $R_6$ can be the same or different.

Examples of boron esters within the above class include:

2-(beta-dimethylaminoisopropoxy)-4,5-dimethyl-1,3,2-dioxaborolane 2-(beta-diethylaminoethoxy)-4,4,6-trimethyl-1,3,2-dioxaborinane 2-(beta-dimethylaminoethoxy)-4,4,6-trimethyl-1,3,2-dioxaborinane 2-(beta-diisopropylaminoethoxy)-1,3,2-dioxaborolane 2-(beta-dibutylaminoethoxy)-4-methyl-1,3,2-dioxaborinane 2-(beta-diethylaminoethoxy)-1,3,2-dioxaborinane 2-(gamma-aminopropoxy)-4-methyl-1,3,2-dioxaborinane 2-(beta-methylaminoethoxy)-4,4,6-trimethyl-1,3,2-dioxaborinane 2-(beta-ethylaminoethoxy)-1,3,6-trioxa-2-boracyclooctane 2-(gamma-dimethylaminopropoxy)-1,3,6,9-tetraoxa-2-boracycloundecane 2-(beta-dimethylaminoethoxy)-4-(4-hydroxybutyl)-1,3,2-dioxaborolane Reaction product of $(CH_3)_1NCH_2CH_2OH$ + lactic acid + $B_2O_3$ + neopentyl glycol A number of such boron esters are known; many are described, for example, in U.S. Pat. Nos. 3,301,804 and 3,257,442. They can be prepared by reacting one mole of boric acid (or equivalent boric oxide) with at least 3 moles of alcohol, at least one mole of the alcohol being an amino-substituted alcohol. The reaction is ordinarily carried out by refluxing the reactants with removal of the water formed.

The amine salts and the epoxy compound are reacted by mixing the components, usually at moderately elevated temperatures such as 70°–110°C. Alternatively in a less preferred embodiment in the case of a tertiary amine, the amine may be added to the epoxy compound and the acid utilized to form the appropriate salt may be subsequently added, even as late as the solubilization step. A solvent is not necessary, although one is often used in order to afford better control of the reaction. Aromatic hydrocarbons or monoalkyl ethers of ethylene glycol are suitable solvents. The proportions of the amine salt and the epoxy compound can be varied and the optimum proportions depend upon the particular reactants. Ordinarily, however, from about one part to about 50 parts by weight of the salt per 100 parts of epoxy compound is employed. The proportions are usually chosen with reference to the amount of nitrogen, which is typically from about 0.05 to about 16 percent based on the total weight of the amine salt and the epoxy compound. Since the amine salt reacts with the epoxide groups of the epoxy resin employed, in order to provide an epoxy group-containing resin, the stoichiometric amount of amine employed should be less than the stoichiometric equivalent of the epoxide groups present, so that the final resin is provided with one epoxy group per average molecule.

The particular reactants, proportions and reaction conditions should be chosen in accordance with considerations well-known in the art, so as to avoid gellation of the product during the reaction. For example, excessively severe reaction conditions should not be employed. Similarly, compounds having reactive substituents should not be utilized along with epoxy compounds with which those substituents might react adversely at the desired conditions.

The product forming the resin of the invention may be crosslinked to some extent; however, it remains soluble in certain organic solvents and can be further cured to a hard, thermoset state. It is significantly characterized by its epoxy content and chemically-bound quaternary ammonium content.

Aqueous compositions containing the above reaction products are highly useful as coating compositions and can be applied by any conventional method, such as by dipping, brushing, etc. They are, however, eminently suited to application by electrodeposition.

Where the resin of the invention was prepared employing at least in part a salt of an acid having a dissociation constant greater than $1 \times 10^{-5}$, it is not necessary to add a solubilizing agent to the product to obtain a suitable aqueous electrodepositable composition, although an acid or acidic solubilizing agent can be added if desired. Where boric acid salts or similar boron compounds as described above are employed to prepare the resin without the presence of a salt of an acid having a dissociation constant greater than $1 \times 10^{-5}$, compositions within the scope of this invention can be prepared by adding such an acid, the stronger acid replacing the boron compound in the resin and the boron compound forming substantially undissociated boric acid remaining in the aqueous media and being at least partially codeposited with the resin.

The presence of a boron compound in the electrodeposited film is of substantial benefit in that boron compounds apparently catalyze the cure of the deposited film, allowing lower cure temperatures and/or harder films.

The acid or acidic solubilizing agent may be any acid having a dissociation constant greater than $1 \times 10^{-5}$. Preferably, the acid or acidic solubilizing agent should be an organic acid having a dissociation constant greater than about $1 \times 10^{-5}$, the presently preferred acid being lactic acid. The addition of acid aids in stabilizing the resin, since the epoxy may tend to further polymerize on storage under highly alkaline conditions; in some cases, the acid also helps to obtain more complete dissolution of the resin. It is also desirable to electrodeposit these coatings from an acidic or only slightly basic solution (e.g., having a pH between about 3 and about 8.5), and the addition of acid thus is often useful to achieve the desired pH.

Where a carboxyl amine is employed in forming the resin of the invention, the resultant resin contains a Zwitterion, or internal salt, that is, an interaction between the quaternary group formed and the carboxyl group present, the carboxyl group displaying a dissociation constant greater than $1 \times 10^{-5}$. The resultant resin is inherently self-solubilized without the use of external solubilizing agents.

The resin of the invention when placed in a water-containing medium, such as an electrodeposition high solids feed concentrate or the electrodeposition bath, changes character. Since frequently the boron, if present, is apparently weakly chemically-bound in the resin, it is subject to cleavage from the resin molecule and, while the boron electrodeposits with the resin and is found in the electrodeposited film, the boron may be removed from the water-containing medium in whole or in part by separation means, such as electrodialysis or ultrafiltration, in the form of boric acid.

Thus, the resin in aqueous medium can be characterized as a water-containing medium containing an ungelled water-dispersible epoxy resin having at least one 1,2-epoxy group per average molecule, and chemically-bound quarternary ammonium base salts.

The resin contains from about 0.05 to about 16 percent by weight nitrogen, at least about one percent of said nitrogen and preferably about 20 percent, more preferably 50 percent, and most preferably, substantially all of the nitrogen being in the form of chemically-bound quaternary ammonium base salt groups; preferably the remainder of said nitrogen being in the form of amino nitrogen, preferably tertiary amine nitrogen, said water-containing medium containing in the preferred embodiment from about 0.01 to about 8 percent by weight of boron metal contained in boric acid and/or a borate or boric acid complex.

The concentration of the product in water depends upon the process parameters to be used and is, in general, not critical, but ordinarily the major proportion of the aqueous composition is water, e.g., the composition may contain from one to 25 percent by weight of the resin.

Preferably, the electrodepositable compositions of the invention contain a coupling solvent. The use of a coupling solvent provides for improved deposited film appearance. These solvents include hydrocarbons, alcohols, esters, ethers, and ketones. The preferred coupling solvents include monalcohols, glycols, and polyols as well as ketones and ether alcohols. Specific coupling solvents include isopropanol, butanol, isophorone, Pentoxane (4-methoxy-4-methyl pentanone-2), ethylene and propylene glycol, the momomethyl, monoethyl and monobutyl ethers of ethylene glycol, 2-ethylhexanol, and hexyl Cellosolve. The presently preferred coupling solvent is 2-ethylhexanol. The amount of solvent is not unduly critical, generally between about 0.1 percent and about 40 percent by weight of the dispersant may be employed, preferably between about 0.5 to about 25 percent by weight of the dispersant is employed.

While the resins hereinabove described may be electrodeposited as substantially the sole resinous component of the electrodeposited composition, it is frequently desirable in order to improve or modify film appearance and/or film properties, to incorporate into the electrodepositable compositions various non-reactive and reactive compounds or resinous materials such as plasticizing material including N-cyclohexyl-p-toluene sulfonamide, ortho- and para-toluene sulfonamide, N-ethyl-ortho- and para-toluene sulfonamide, aromatic and aliphatic polyether polyols, phenol resins including allyl ether containing phenolic resins, liquid epoxy resins, quadrols, polycaprolactones; triazine resins such as melamine-based resins and benzoguanamine-based resins, especially alkylated formaldehyde reaction products thereof; urea formaldehyde resins, acrylic resins, hydroxy and/or carboxyl group-containing polyesters and hydrocarbon resins.

Other materials include esters such as butylbenzyl phthalate, dioctyl phthalate, methyl phthalylethyl glycolate, butylphthalylbutyl glycolate, cresyl diphenyl phosphate, 2-ethylhexyl diphenyl phosphate, polyethylene glycol 200 dibenzoates as well as polyesters, 2,2,4-trimethyl pentanediol monoisobutyrate (Texanol).

In most instances, a pigment composition and, if desired, various additives such as anti-oxidants, surfactants, or wetting agents, for example, Foam Kill 639 (a hydrocarbon oil-containing inert diatomaceous earth), as well as glycolated acetylenes (the Surfynols, for example), sulfonates, sulfated fatty amides, and alkyl-phenoxypolyoxyalkylene alkanols, and the like, are included. The pigment composition may be of any conventional type, comprising, for example, iron oxides, lead oxides, strontium chromate, carbon black, titanium dioxide, talc, barium sulfate, as well as color pigments such as cadmium yellow, cadmium red, chormic yellow, and the like.

In the electrodeposition processes employing the aqueous coating compositions described above, the aqueous composition is placed in contact with an electrically-conductive anode and an electrically-conductive cathode, with the surface to be coated being the cathode, while in contact with the bath containing the coating composition, an adherent film of the coating composition is deposited on the cathode. This is directly contrary to the processes utilizing polycarboxylic acid resins, as in the prior art, and the advantages described are, in large part, attributed to this cathodic deposition.

The conditions under which the electrodeposition is carried out are, in general, similar to those used in electrodeposition of other types of coatings. The applied voltage may be varied greatly and can be, for example, as low as one volt or as high as several thousand volts, although typically between 50 and 500 volts. The current density is usually between about 1.0 ampere and 15 amperes per square foot, and tends to decrease during electrodeposition.

The resin of the invention when freshly electrodeposited on the cathode contains quaternary ammonium base groups. The acid moiety which forms the salt migrates at least in part toward the anode. Where the electrodeposition bath contains boron, the electrodeposited resin further contains boron which is bonded with the basic groups present in the film which has electrodeposited upon the cathode. The amounts of bonded boron in the electrodeposited film increase with increasing boron concentration in the bath to a saturation value, dependent on the number of basic groups in the concentration and the basicity of the base groups.

The film, while it may be crosslinked to some extent, remains soluble in certain organic solvents.

The freshly-deposited, uncured electrodeposited film may be characterized as follows: an epoxy resin electrodeposited upon an electrically-conductive substrate comprising an ungelled epoxy resin having at least one 1,2-epoxy group per average molecule, chemically-bound quaternary ammonium base, and where boron is present in the electrodepositable composition, 0.01 to about 8 percent by weight of boron in the form of quaternary and amine borates and boron complexes.

The method of the invention is applicable to the coating of any conductive substrate, and especially metals such as steel, aluminum, copper, magnesium, or the like. After deposition, the coating is cured, usually by baking at elevated temperatures. Temperatures of 250°F. to 500°F. for one to 30 minutes are typical baking schedules utilized.

During the cure, especially at elevated temperatures, at least a substantial portion of the quaternary ammonium base decomposes to tertiary amine nitrogen, which aids in the crosslinking of the coating, which upon curing is infusible and insoluble. The presence of boron salts and complexes in the film increases the rate of crosslinking, reduced the temperatures necessary for acceptable curing in commercially-reasonable times and produces coatings with improved hardness and corrosion resistance.

As set forth above, the significant resin constituents are (A) a resin having epoxy groups; (B) quaternary ammonium groups; (C) salts of acids having a dissociation constant greater than $1 \times 10^{-3}$ and, optionally, (D) amine groups and (E) boron. All these components may be qualitatively and quantitatively determined by numerous methods known in the art.

Epoxy groups may be determined by the well-known pyridinium hydrochloride method as described, for example, in Siggia, "QUANTITATIVE ORGANIC ANALYSIS VIA FUNCTIONAL GROUPS", John Wiley & Sons, Inc., New York (1963), page 242.

The total base groups present in the polymer, that is, quaternary and amine groups present, may be determined on a separate resin sample. Usually the resin sample will be neutral. If, however, the resin is basic, the sample should be neutralized with a known amount of the acid present in the resin as a salt. Where the acid present in the resin as a salt is a weak acid as compared to HCl, the resin is titrated with HCl and back-titrated with sodium hydroxide on an automatic titrator. The HCl titration yields the total base groups present. The sodium hydroxide back-titration distinguishes quaternary groups from amine groups. For example, a typical analysis is conducted as follows: a 10 milliliter sample of an about 10 percent solids electrodeposition bath is pipetted in 60 milliliters of tetrahydrofuran. The sample is titrated with 0.1000 normal HCl to the pH end point. The amount of standard acid used is equivalent to the quaternary base and amine equivalents present. The sample is then back titrated with 0.1000 normal sodium hydroxide to give a titration curve with multiple end points. In a typical instance, the first end point corresponds to excess HCl. From the HCl titration, the second end point corresponds to the neutralization of the weak acid (for example, lactic acid) and amine hydrochloride. The difference in volume between the two endpoints gives the volume of standard base equivalent to the weak acid and amine content of the sample.

Whereas solvent such as propylene glycol is employed with, for example, tetrahydrofuran to maintain sample homo-geniety, boron present will also titrate since the borons in the form present forms an acid complex with the propylene glcyol. Under the conditions specified, the boric acid may be distinguished from the weak acid (e.g., lactic) by an additional inflection point in the pH titration curve. Depending on the strength of the amine group present, it may be included either in the weak acid (e.g., lactic) or boric acid portion of the titration curve.

Excess weak acid or amine salt in the electrodeposition bath may be determined by alcoholic-KOH titration. For example, a 10 milliliter sample of about 10 percent solids electrodeposition bath is pipetted into 60 milliliters of tetrahydrofuran and potentiometrically titrated with 0.1000 normal alcoholic KOH to the first end point. The amount of KOH consumed is equivalent to any acid or amine salt in the sample. In the case of neutral compositions, KOH titration is a measure of the amount of amine present in the form of amine salt since the quaternary, being a strong base, will not titrate.

In the case of the presence of acid salts of strong acids, other methods must be employed to determine acid, amine and quaternary groups present. For example, where the resin contains amine hydrochloride and quaternary hydrochloride groups, the resin may be dispersed, for example, in a mixture of glacial acetic acid and tetrahydrofuran, the chloride complexed with mercuric acetate and the sample titrated with perchloric acid to yield the total amine and quaternary groups. Separate alcholic KOH titration will yield the amine groups present since the quaternary is of comparable strength to the alcoholic KOH.

Boron may be determined as described by R. S. Braman, "Boron Determination", ENCYCLOPEDIA OF INDUSTRIAL CHEMICAL ANALYSIS, F. D. Snell and Hilton, Editors, John Wiley & Sons, Inc., New York (1968), volume 7, pages 384–423. The boron may be determined on a separate sample. For example, by pipetting a 10 milliliter sample of an approximately 10 percent solid cationic electrodeposition bath into 60 milliliters of distilled water. Sufficient HCl is then added to lower the pH to about 4.0. The sample is then back-titrated with 0.1000 normal sodium hydroxide, using a Metrohm Potentiograph E–436 automatic titrator or equivalent apparatus, to the first inflection point in the pH titration curve. There is then added 7 grams of mannitol. The solution becomes acid and titration is then continued to the second inflection point in the pH titration curve. The amount of base consumed between the first and second endpoints is a measure of the number of moles or boric acid complex formed in the sample.

The above description is exemplary of the technique employed to quatitatively and qualitatively identify the groups present. In specific case, analytical techniques may be adapted to a specific resin; however, in each case, consistent with the above description, there exists methods known in the art which yield appropriate accurate determinations of the significant chemical moiety content.

Illustrating the invention are the following examples, which, however, are not to be construed as limiting the invention to their details. All parts and percentages in the examples, as well as throughout this specification are by weight unless otherwise specified. In several of the examples, there are employed oxyalkylene containing polyepoxides produced by reacting one mole of poly(oxyalkylene)glycol with two moles of polyepoxide. "Polyepoxide A" as utilized below is such a reaction product made from polypropylene glycol (molecular weight about 425) and "Epon 834", which is a Bisphenol A epichlorohydrin epoxy having an average molecular weight of about 450 and an epoxide equivalent of 225–290. "Polyepoxide B" is the reaction product made from polypropylene glycol (molecular weight about 1500) and "Epon 1032", a Bisphenol-epichlorohydrin epoxy having an average molecular weight of about 900 and an epoxide equivalent of about 225.

EXAMPLE A

Into a reactor equipped with thermometer, stirrer, distillation apparatus with reflux condenser, water trap and means for providing an inert gas blanket were charged 741.6 parts of dimethylethanolamine, 714 parts lactic acid and 300 parts toluene. The reaction mixture was heated to between 105° and 110°C. for 4 hours. A total of 120 parts of water were collected with an index of refraction of $n_D^{25}$ 1.377. There was then added 245 parts of boric oxide, 728 parts neopentyl glycol. The reaction mixture was heated between 115°C. and 128°C. for approximately 4 hours, collecting an additional 205 parts of water of reaction $n_D^{25}$ 1.386. The reaction product had a percent nitrogen content of 4.51 and has a proposed structure of:

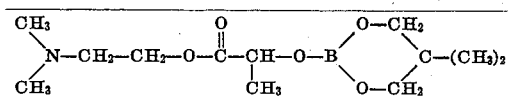

This product is hereinafter referred to as the product of Example A.

In several of the examples, there are employed oxyalkylene-containing monoalcohols produced by reacting ethanol with ethylene oxide using potassium hydroxide catalyst. "Monoalcohol A", as utilized below, is such a reaction product made with 5 moles of ethylene oxide per mole of ethanol and "Monoalcohol B" is the reaction product of 10 moles of ethylene oxide per mole of ethanol.

EXAMPLE I

A reaction vessel was charged with 200 parts of an epoxy resin made from the reaction of epichlorohydrin and Bisphenol A, having an epoxide equivalent of 290 to 335 and a molecular weight of 580–670 (Epon 836). There were added 58.5 parts of Monoalcohol A, 2.3 parts of stannous chloride and 28 parts of the dimethyl ether of diethylene glycol, and the mixture was heated at 145°–150°C. for 3 hours. The modified epoxy compound obtained contained oxyalkylene groups and had an epoxide equivalent of about 890. Two hundred parts of the modified epoxy compound were heated to 70°C. with stirring and then 13 parts of 2-(beta-dimethylaminoethoxy)-4-methyl-1,3,2-dioxaborinane were added over a 21 minute period, during which time the temperature rose to 92°C. After five minutes there were added 1719 parts of deionized water, with stirring, along with sufficient formic acid to make the pH of the solution 4.4. There was obtained a colloidal dispersion having a non-volatile solids content of 9.1 percent. The solids component analyzes to contain quaternary base groups and boron. This dispersion was electrodeposited using steel electrodes and the following conditions:

| | |
|---|---|
| Bath temperature | 70°F. |
| pH | 4.4 |
| Deposition time | 180 seconds |
| Voltage | 225 volts |
| Current | 1.5–20 amp. |

There was obtained an adherent coating on the cathode which was then baked at 400°F. for 20 minutes. The electrodeposited wet film analyzes to contain quaternary borate and quaternary hydroxide. The cured coating was hard, smooth and adherent, having a thickness of about one mil. It was highly resistant to acetone and had excellent salt-spray and alkali resistance.

EXAMPLE II

Example I was repeated except that the cathode employed was aluminum. Similar results were obtained; the coating deposited had good adhesion to the aluminum and other satisfactory properties.

EXAMPLE III

The epoxy resin employed in this example as a reaction product of epichlorohydrin and Bisphenol A having a molecular weight of 660–760 and an epoxide equivalent of 330–380 (Epon 840). It was reacted with the following by heating at 150°–155°C. for 8 hours.

|  | Parts by Weight |
| --- | --- |
| Epoxy resin | 445 |
| Monalcohol B | 125 |
| Formic acid (90%) | 9.5 |
| Diethylene glycol dimethyl ether | 63 |

The product had an epoxide equivalent of 737; 200 parts thereof were reacted with 16.3 parts of 2-(beta-dimethylaminoethoxy)-4-methyl-1,3,2-dioxaborinane in the manner of the above examples. The product, after addition of formic acid and water was a solution having a pH of 4.9 and a solids content of 38 percent; it provided electrodeposited coatings of excellent properties.

EXAMPLE IV

Example III was repeated except that Monoalcohol A was employed and the reaction product was acidified with acetic acid to a pH of 5.6. A solution of similar properties was obtained.

EXAMPLE V

In this example, there was utilized an epoxy compound containing oxyalkylene groups produced from the following:

|  | Parts by Weight |
| --- | --- |
| Epoxy resin (as in Example I) | 2500 |
| Monoalcohol A | 441 |
| Formic acid (90%) | 49 |

This modified epoxy compound had an epoxide equivalent of 642. To 325 parts of the epoxy compound at 70°C. there was slowly added a solution of 37.8 parts of boron ester produced from one mole of boron oxide ($B_2O_3$), 2 moles of diethylene glycol and 2 moles of dimethylethanolamine; the ester was understood to be 2-(beta-dimethylaminoethoxy)-1,3,6-trioxa-2-boracyclooctane, having the structure:

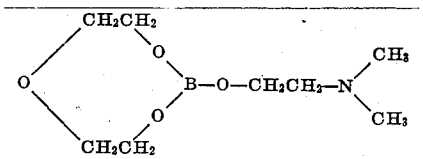

The boron ester was dissolved in a mixture of 37.8 parts of butyl Carbitol acetate and 26.4 parts of isophorone. After the addition, which took 20 minutes, was completed, the temperature was 90°C. and heating was continued for 2 minutes. There was added 89.5 parts of deiohized water and sufficient 50 percent aqueous acetic acid to make the pH 4.6. The clear solution obtained was electrodeposited as described above and the deposited film baked at 375°F. for 20 minutes. The glossy coating obtained was adherent, hard and flexible, and was highly resistant to acetone.

EXAMPLE VI

In this example, there was employed a boron ester produced from one mole of boron oxide, 2 moles of dimethylethanolamine and 4 moles of n-hexanol; this product was understood to be beta-dimethylaminoethyl-di-n-hexyl borate, having the structure:

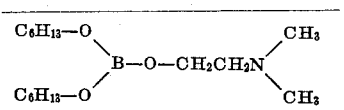

This boron ester (55.5 parts) was reacted with 117 parts of the oxyalkylene-modified epoxy compound as in Example V; the reaction product acidified with acetic acid to a pH of 4.5, produced clear solution in water.

EXAMPLE VII

In this example, there was utilized a boron ester made from 3 moles of 1,3-butanediol, 3 moles of 2-ethylaminoethanol and 1.5 moles of $B_2O_3$. The boron ester was understood to be 2-(beta-ethylaminoethoxy)-4-methyl-1,3,2-dioxaborinane, having the structure:

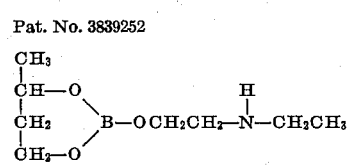

This boron ester (17.4 parts) was reacted in the manner of the foregoing examples with 200 parts of epoxy compound (epoxide equivalent 665) made from an epoxy resin from the reaction of epichlorohydrin with Bisphenol A (epoxide equivalent 225–290; "Epon 834"), by heating the following at 108°–117°C. for 6¾ hours:

|  | Parts by Weight |
| --- | --- |
| Epoxy resin | 2000 |
| Propylene glycol (molecular weight 425) | 175 |
| Isophorone | 150 |
| Dimethylbenzylamine | 2.8 |

The product mixture was neutralized with 1.1 parts of 90 percent formic acid; it had an epoxide equivalent of 665 (100 percent solids basis).

Water and 50 percent aqueous formic acid were added to the reaction product to give a solution having a pH of 4.45. It was electrodeposited as described above and after baking for 20 minutes at 385°F. A smooth, glossy, solvent-resistant coating was obtained.

EXAMPLE VIII

In this example, the boron ester used was made from 2 moles of 1,3-butanediol and 2 moles of 3-amino-1-propanol per mole of B₂O₃, and was understood to have the structure:

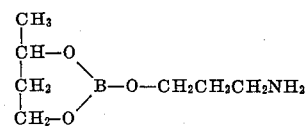

The epoxy compound used was made by reacting 2000 parts of epoxy resin (Epon 834) and 825 parts of polyethylene glycol (molecular weight 400) in the presence of 725 parts of isophorone and 14 parts of dimethyl benzylamine. Seventy parts of the boron ester (50 percent solids) and 500 parts of the epoxy compound (80 percent solids) were reacted as above; after the addition of water and formic acid, the resultant solution was electrodeposited and baked to give an adherent, thermoset coating.

EXAMPLE IX

The boron ester utilized in this example was made from 2 moles of boric acid, 2 moles of neopentyl glycol, 2 moles of glycolic acid and 3 moles of dimethylethanolamine; it was understood to have the structure:

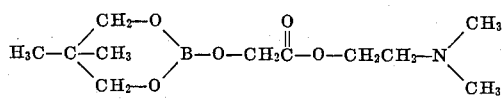

and at least contains some salt of the apparent structure:

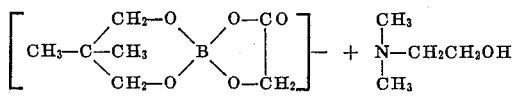

Sixty-five parts of the boron ester (60 percent solids in isopropyl alcohol) were reacted with 500 parts of the epoxy compound employed in Example XII (80 percent solids). Addition of water and formic acid gave a clear solution with a pH of 7.8; it was electrodeposited at 230 volts to give a coating which after baking at 400°F. for 10 minutes was hard, flexible and solvent resistant.

While a particular advantage of the compositions herein is the manner in which they electrodeposit as described above, they also can be applied by other more conventional methods. Furthermore, although compositions for electrodeposition are usually neutralized to an acidic pH, such compositions in many cases are not neutralized; also, certain reaction products which are less desirable in an electrodeposition process can be applied in other ways to give coatings suitable for many purposes. The following examples illustrative such embodiments.

EXAMPLE X

A mixture of 280 parts of epoxy resin from the reaction of epichlorohydrin with polypropylene glycol (Dow Epoxy Resin 736 — epoxide equivalent 186 and molecular weight 372) and 342 parts of Bisphenol A were heated with 11 parts of 85 percent formic acid for 10 hours at 140°–150°C. The product (547 parts) was reacted with 1070 parts of epichlorohydrin in the presence of sodium hydroxide. The product, after stripping to remove excess epichlorohydrin, was an epoxy compound containing oxyalkylene groups in the polymer chain and having an epoxide equivalent of 528.

The epoxy compound thus obtained was mixed with 42 parts of butyl Cellosolve acetate and reacted with 30.4 parts of 2-(beta-dimethylaminoethoxy)-4-methyl-1,3,2-dioxaborinane in the manner described above; the reaction product was acidified with aqueous acetic acid to a pH of 5.2. There was obtained a colloidal solution which was electrodeposited as above with good results. The coating deposited on the cathode and after baking at 350°F. for 30 minutes was adherent and had good solvent resistance, although somewhat soft.

EXAMPLE XI

Into a reactor was charged 1770 parts of Epon 829 and 302 parts of Bisphenol A. The mixture was reacted at 170°–180°C. for 45 minutes. The reaction mixture was then cooled at 130°C. There was then added 790 parts of polypropylene glycol (molecular weight 600) and the reaction mixture held at 130°C. until the reaction mixture reached a Gardner-Holdt viscosity of L-N, measured at 50 percent solids in 90/10 isophorone/toluene mixture. The approximate reaction time for this step was about 5 hours. The reaction mixture was then cooled to 120°C. and there was then added 6 parts of a 90 percent formic acid solution to neutralize the amine present. The reaction mixture was then cooled to 70°C. and there was then added 318 parts of the boron compound of Example A, supra, and 82 parts of isopropanol over a 20 minute period, increasing the temperature during that period from 70° to 90°C. The mixture was held at 95°C. for 5 minutes after the addition was complete. There was then slowly added 500 parts of water. When the mixture was homogeneous there was slowly added 15.5 parts of a surfactant (Foam Kill 639) and 200 parts of 2-ethylhexanol. There was then added an additional 840 parts of water.

This composition contained 0.225 milliequivalents of quaternary groups/gram, 0.213 milliequivalents of lactic acid/gram and 0.228 milliequivalents of boron/gram.

The composition above, when electrodeposited from a 10 percent solids aqueous electrodeposition bath (80°F.) at 250 volts for 90 seconds on phosphatized steel panels, then rinsed and baked for 30 minutes at 350°F. yielded a 0.6 mil film with a greater than 6 H pencil hardness which was highly acetone resistant and had excellent salt spray resistance.

EXAMPLE XII

An amine of the formula (CH₃)₂NCH₂CH₂COOH was produced from the reaction of dimethylamine (25 percent solution in water) with methyl acrylate, as described in U.S. Pat. No. 3,419,525. This amine (50 parts) was added to a reaction vessel containing 450 parts of Polyepoxide A at 65°C. The temperature rose to 82°C. in 20 minutes; 850 parts of deionized water were slowly added with stirring over a period of 45 minutes. The product was a yellow, clear solution having a solids content of 37.3 percent and an epoxy value of 6361.

The above resin solution after dilution to 10 percent solids with deionized water was electrodeposited using zinc phosphate treated steel electrodes and the following conditions:

| | |
|---|---|
| Bath temperature | 80°F. |
| pH | 6.0 |
| Deposition time | 60 seconds |
| Voltage | 400 volts |
| Current | 0.4 amp. max. |

There was obtained an adherent coating on the cathode which was then baked at 400°F. for 10 minutes. The cured coating was hard, flexible, and adherent, having a thickness of about 1.2 mil. It was highly resistant to acetone.

EXAMPLE XIII

Example XII was repeated except that the cathode employed was aluminum. Similar results were obtained.

EXAMPLE XIV

An amine of the formula $(CH_3)_2NCH_2CH_2OCOCH_2CH_2COOH$ was produced by reacting dimethylethanolamine with succinic anhydride. This amine (4.7 parts) was reacted with 87 parts of Polyepoxide B at 70°C. and diluted with deionized water to a solids content of 59 percent. A 3 mil wet film of this resin solution was drawn on a steel panel and baked at 350°F. for 10 minutes. A hard glossy cured adherent coating was obtained, having excellent solvent resistance.

The resin solution was further diluted to 10 percent solids with deionized water and formic acid added to a pH of 4–5. Electrodeposition of this product using steel electrodes at 250 volts for 90 seconds provided an adherent coating on the cathode. After baking at 350°F. for 10 minutes, the coating had good solvent resistance.

EXAMPLE XV

A reaction vessel containing 53.5 parts of Polyepoxide A (80 percent solids in isophorone) was heated to 70°C. There were added 3 parts of an amine produced by reacting dimethylethanolamine with dodecylsuccinic anhydride, and then there were added 6 parts of a second amine produced from dimethylethanolamine and maleic anhydride. During the second addition the temperature was raised to 95°C. and stirring was continued for 15 minutes at this temperature. The product when diluted with water and electrodeposited, as in the above examples, provided an adherent solvent-resistant coating.

EXAMPLE XVI

An amine of the formula $(CH_3)_2NCH_2CH_2OCOCH{=}CHCOOH$ was made by reacting dimethylethanolamine with maleic anhydride. This amine (53 parts) was reacted at 70°C. with 530 parts of an oxyalkylene-modified polyepoxide produced from 400 parts of Epon 834 with 165 parts of polyethylene glycol (molecular weight 400). After the reaction had progressed for 20 minutes the temperature was 94°C.; there were added 23 parts of isophorone and 425 parts of deionized water, followed by sufficient aqueous formic to make the pH 3.7. Additional water was added to make the solids content 10 percent and the composition electrodeposited, using an aluminum cathode, at 150 volts for 15 seconds; the maximum current was 2.9 amps. An adherent coating was obtained on the cathode which after baking at 400°F. for 30 minutes was hard, glossy and solvent-resistant.

EXAMPLE XVII

An amine of the formula

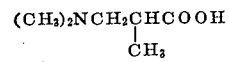

was produced from the reaction of dimethylamine with methyl methacrylate in aqueous solution. Following the procedure of the above examples, 27.8 parts of this amine were reacted with 250 parts of polyepoxide (diglycidyl ether of Bisphenol A, epoxide equivalent 185–200; "Epi-Rez 510") in the presence of 77 parts of the dimethyl ether of diethylene glycol. Water and formic acid were used to reduce the solids content to 5 percent and the pH to 5.9. Electrodeposition of the product on strips of zinc phosphate-treated steel at 200 volts for 20 seconds provided adherent films which after baking at 385°F. for 30 minutes were hard, glossy, extremely solvent-resistant coatings.

EXAMPLE XVIII

Into a reaction vessel equipped with stirrer, thermometer, condenser, inert gas sparge and heating element was charged 336 parts of Epon 829 and 113 parts of Bisphenol A. The mixture was heated to 180°C., at which time an exotherm was noted. The reaction mixture was held at 180°–190°C. for 45 minutes. The reaction mixture was then cooled to 110°C., at which time 40 parts of isopropanol were added. The reaction mixture was further cooled to 80°C. and a solution comprising 42.7 parts of 2-(β-dimethylaminoethoxy)-4-methyl-1,3,2-dioxaborinane and 10.7 parts of isopropanol were added over a 20 minute period at a temperature between 80° and 90°C. The reaction mixture was held at 94°C. for 5 minutes after the addition. There was then added 107 parts of water over a 4-minute period. There resulted a clear brown resin solution.

To the solution at a temperature of 74°C. was added a solution of 2.4 parts of Foam-Kill 639 dissolved in 33 parts of 2-ethylhexanol. The resultant resin solution adjusted to 100 percent solids, had the following characteristics:

| | |
|---|---|
| Epoxy value | 752 |
| Hydroxyl value | 275 |

EXAMPLE XIX

Electrodepositable compositions were prepared as follows:
Part A
To 272 parts of the resin solution of Example XVIII were added 1630 parts of deionized water. The material dispersed with difficulty to yield a milky dispersion containing 9.36 percent solids and a pH of 9.3. The resultant electrodepositable composition was electrodeposited on zinc phosphated steel panels. The composition had a rupture voltage of 400 volts at 80°F. When electrodeposited at 250 volts for 90 seconds, the bath temperature at 80°F. resulted in a rough wet film. The baked film (350°F. for 25 minutes) was rough and contained bubbles. Analysis of the electrodeposition bath yielded the following data:

| | |
|---|---|
| Milliequivalents of quaternary base groups per millimeter | 0.0374 |
| Milliequivalents of amine groups per milliliter | 0.0038 |
| Milliequivalents of boric acid per milliliter | 0.0444 |

Part B

To 272 parts of the resin solution of Example XVIII were added 10 parts of 85 percent lactic acid and 1630 parts of deionized water to yield an electrodepositable composition containing 10.3 percent solids and a pH of 6.3. The resin was easily dispersed and had an almost clear colloidal appearance. The composition had a rupture voltage of 400 volts at 80°F. and when a zinc phosphated steel plane was electrodeposited, smooth films resulted. When baked at 350°F. for 25 minutes, a smooth, solvent-resistant film at 6H pencil hardness was obtained.

The electrodeposition bath yielded the following analytical results:

| | |
|---|---|
| Milliequivalents of quaternary base groups per milliliter | 0.0419 |
| Milliequivalents of amine groups per milliliter | 0.0013 |
| Milliequivalents of lactic acid per milliliter | 0.0437 |
| Milliequivalents of boric acid per milliliter | 0.0484 |

Particle size of the dispersions of Part A and Part B were determined by light scattering techniques. In a light source of 4358 angstroms, Part A displayed a particle size of 560 angstroms and Part B displayed a particle size of 290 angstroms; with a light source of 5460 angstroms, Part A displayed a particle size of 630 angstroms and Part B displayed a particle size of 300 angstroms.

EXAMPLE XX

Into a reactor as described in Example XVIII was charged 1000 parts of Epon 829 and 335 parts of Bisphenol A. The reaction mixture was heated to 170°C. at which time an exotherm was noted. The reaction mixture was held at 180°–185°C. for 45 minutes. The reaction mixture was then cooled to 117°C. and there was added 125 parts of isopropanol. The reaction mixture was further cooled to 80°C. and there was added 230 parts of Example A (80 percent solids in isopropanol). The addition was made over a period of 20 minutes at a temperature of 80°–90°C. After the addition was complete, the reaction mixture was held at a temperature of 90°–94°C. for 5 minutes. There was then added 375 parts of deionized water over a 5-minute period. At a temperature of 70°C. there was added 7.6 parts of Foam-Kill 639 in 100 parts of 2-ethylhexanol solution. The resultant resin solution was clear brown and had the following properties, adjusted to 100 percent solids:

| | |
|---|---|
| Epoxy value | 1125 |
| Hydroxyl value | 293 |

To 272 parts of the above resin solution was added 1630 parts of deionized water. The resin was easily dispersed to yield a blue-green colloidal solution containing 9.74 percent solids and a pH of 6.8. The electrodepositable composition displayed a rupture voltage of 410 volts at 80°F. Zinc phosphated steel panels were electrocoated at 250 volts for 90 seconds at a bath temperature of 85°F. There resulted an electrodeposited film which when baked at 350°F. for 25 minutes yielded a slightly textured smooth glossy film.

The electrodeposition bath yielded the following analysis:

| | |
|---|---|
| Milliequivalents of quarternary base groups per milliliter | 0.0379 |
| Milliequivalents of amine groups per milliliter | 0.0011 |
| Milliequivalents of lactic acid per milliliter | 0.0374 |
| Milliequivalents of boric acid per milliliter | 0.0392 |

EXAMPLE XXI

Into a reactor equipped as described in Example XVIII was charged 500 parts of Epon 840 and 65 parts of isophorone.

A salt solution was prepared by admixing 32.5 parts of dimethylethyanolamine, 22.5 parts of acetic acid and 15.5 parts of isopropanol. The salt solution was added to the above resin solution beginning at a temperature of 49°C. over a period of 20 minutes, with the temperature ranging from 49°C. to 75°C. After the addition was complete the reaction mixture was held at 75°–85°C. for an additional 5 minutes. There was then added 287 parts of deionized water over a 5-minute period to yield the resin solution at a temperture of 62°C. The analysis of the resin, adjusted to 100 percent solids, was as follows:

| | |
|---|---|
| Epoxy value | 650 |
| Hydroxyl value | 140 |
| Quaternary acetate groups per gram of resin | 0.3644 |
| Milliequivalents of amine acetate per gram of resin | 0.085 |

To 215 parts of the above resin solution was added 1200 parts of deionized water. The resultant electrodeposition bath had a pH of 8.5. Films when electrodeposited at 150 volts were rough, hard films.

EXAMPLE XXII

Into a reactor as described in Example XVIII were charged 500 parts of Epon 840 and 65 parts of isophorone. A salt solution was prepared from 32.2 parts of dimethylethanolamine and 22.8 parts of boric acid and 15.5 parts of isopropanol and 20 parts of deionized water. The salt solution was added to the above resin solution beginning at a temperature of 55°C. over a 20-minute period with the temperature ranging from 55°–76°C. The reaction mixture was held for five minutes at a temperature of 76°–85°C. after the addition was complete. There was then added 287 parts of deionized water over a 4-minute period to yield a resin solution at 62°C. The analysis of the resin solution, adjusted to 100 percent solids, was as follows:

| | |
|---|---|
| Epoxy value | 573 |
| Hydroxyl value | 93 |

To 215 parts of the above resin solution were added 1200 parts of deionized water to yield an electrodeposition bath with a pH of 9.7. The electrodeposition bath had a rupture voltage of 200 volts. Electrodeposited films were rough and bubbly. The electrodeposition bath had the following analysis:

| | |
|---|---|
| Milliequivalents of quarternary base groups per milliliter | 0.0602 |
| Milliequivalents of boric acid per milliliter | 0.0657 |

The electrodeposited film was analyzed to contain 0.0967 milliequivalents of quarternary borate groups per gram. The wet film contained 63 percent solids.

To 215 parts of the intial resin solution were added 3 parts of 85 percent lactic acid and 1200 parts of deionized water to yield an electrodeposition bath having a pH of 8.5. Films electrodeposited under the same conditions as previously showed improved film appearance and resulted in a uniform film on baking. The electrodeposition bath was analyzed to contain:

| | |
|---|---|
| Milliequivalents of quarternary base per milliliter | 0.0617 |
| Milliequivalents of lactic acid | 0.0337 |
| Milliequivalents of boric acid per milliliter | 0.0693 |

The wet electrodepositable film was analyzed to contain 0.1474 milliequivalents of quarternary borate groups per gram. The wet film had a solids content of 66.9 percent.

EXAMPLE XXIII

Into a reactor as described in Example XVII were charged 400 parts of Epon 829 and 100 parts of Bisphenol A. The reaction mixture was heated to 170°C. at which time an exotherm occurred. The reaction mixture was heated at 175°–184°C. for 45 minutes and then cooled to 155°C. There was then added 90 parts of isophorone, and the reaction mixture was cooled to 70°C. The reaction mixture is hereinafter referred to as the base resin.

There was then added a solution of 55 parts of Example A and 14 parts of isopropanol over a 20 minute period at temperatures between 70°–90°C. After the addition was complete, the reaction mixture was held at 90°–96°C. for an additional 5 minutes. There was then added 295 parts of deionized water over a 10 minute period. There resulted a resin solution which was apparently clear while being stirred and appeared pearlescent while at rest. The resin solution was analyzed to contain, adjusted to 100 percent solids:

| | |
|---|---|
| Epoxy value | 578 |
| Hydroxyl value | 141 | to 215 parts of the base resin solution were added 1285 parts of deionized water to yield an electrodeposition bath with a pH of 6.7. The electrodeposition bath displayed a throw power of 3 inches at 300 volts for 90 seconds at a bath temperature of 77°F. Zinc-phosphated steel panels electrodeposited at 200 volts for 90 seconds at 77°F. and baked at 350°–380°F. for 30 minutes yielded films of 0.4 mil with a pencil hardness of 6H. The films were smooth and glossy. The electrodeposition bath analyzed to contain:

| | |
|---|---|
| Milliequivalents of quaternary base groups 10 per milliliter | 0.0293 |
| Milliequivalents of lactic acid per milliliter | 0.0280 |
| Milliequivalents of boric acid per milliliter | 0.0311 |

To the base resin as described above was added 55 parts of 2-(β-dimethylaminoethoxy)-4-methyl-1,3,2-dioxaborinane at a temperature of 70°–89°C. over a 20 minute period. The reaction mixture was held for 5 minutes at 89°–100°C. after the addition was complete. There was then added 285 parts deionized water over a 4 minute period and a clear resinous solution was obtained having an epoxy value adjusted to 100 percent solids of 582 and a hydroxyl value (100 percent solids) of 132.5.

To 215 parts of this resin solution was added 1285 parts of deionized water to yield an electrodeposition bath having a pH of 8.9. The electrodeposition bath displayed a throw power of 2⅛ inch. Zinc-phosphated steel panels were electrodeposited at 200 volts in 90 seconds at 77°F. and baked and the resultant film build was 0.25 to 0.3 mil with a 6H+ pencil hardness.

The electrodepositable composition analyzed to contain:

| | |
|---|---|
| Milliequivalents of quaternary base groups per milliliter | 0.0420 |
| Milliequivalents of boric acid per milliliter | 0.0510 |

EXAMPLE XXIV

Into a reactor as described in Example XVIII was charged 500 parts of Epon 834. The resin was heated to 80°C. A salt solution comprising 112.3 parts of 40% dimethylamine in water, and 106 parts of 85% lactic acid in water, having a pH of 4.3, was added at a temperature of 80°–85°C. over a 20 minute period. The reaction mixture was then heated to 97°C. and refluxed for 20 minutes. There was then added 169 parts of deionized water, followed by 100 parts of ethyl Cellosolve and 10 parts of 90 percent formic acid. The resin dispersion was somewhat cloudy. There was then added to the resin dispersion sufficient water to form a 10 percent solids bath. Sufficient formic acid was added to adjust the pH to 2.5.

An aluminum strip was electrocoated at a bath temperature of 80°F. at 100 volts for 60 seconds. The film was deposited on the cathode, which was baked at 350°F. for 20 minutes. A glossy, hard yellow film was obtained.

The resin at 100 percent solids had the following properties:

| | |
|---|---|
| Epoxy value | 1160 |
| Hydroxyl value | 141 |

The electrodeposition bath analyzed to contain:

Milliequivalents of amine per gram

-Continued

| | |
|---|---|
| of resin | 0.2145 |
| Milliequivalents of quarternary base groups per gram of resin | 0.2830 |
| Milliequivalents of acid per gram of resin | 0.4980 |

EXAMPLE XXV

Into a reactor as described in Example XVIII was charged 500 parts of Epon 834. This resin was heated to 80°C. and there was added a salt solution formed by admixing 101 parts of dipropylamine and 106 parts 85 percent lactic acid, together with 33 parts of isopropanol. The salt solution was added at 80°–85°C. with heat over a 20 minute period. After the addition was complete, the reaction mixture was heated to 95°C. and refluxed for 20 minutes. 167 parts of deionized water were then added. A cloudy resin dispersion was obtained, to which was added 100 parts ethyl Cellosolve, 10 parts of 90 percent formic acid. A clear yellow resin solution was obtained.

Analysis of the product adjusted to 100 percent solids is as follows:

| | |
|---|---|
| Epoxy value | 1120 |
| Hydroxyl value | 143 |

The resin was analyzed to contain:

| | |
|---|---|
| Milliequivalents of amine per gram of resin | 0.0675 |
| Milliequivalents of quarternary base groups per gram of resin | 0.4310 |
| Milliequivalents of acid per gram of resin | 0.4985 |

Useful electrodeposited films were obtained.

EXAMPLE XXVI

Into a reactor equipped with stirrer, thermometer condenser, inert gas inlet and heating element was charged 1,005 parts of Epon 829 and 339 parts of bisphenol-A. The mixture was heated to 180°C. and held for 45 minutes at 180°–188°C. There was then added at 120°C. 114 parts of isopropanol and the mixture cooled to 79°C. There was then added 141.0 parts of a 75 percent solids solution in isopropanol of dimethylethanolamine lactate over a 20 minute period between 79°C. and 93°C. with heating. The reaction mixture was held at 93°C–97°C. for two additional minutes, and there was then added 425 parts of deionized water over a four minute period at which time the temperature was 75°C.

There was then added a solution of 7 parts of Foam Kill 639 in 90 parts of 2-ethylhexanol. A clear yellow resin solution was obtained. This is hereinafter referred to as the base resin.

| Analysis (100% solids) | |
|---|---|
| Epoxy value | 1085 |
| Hydroxyl value | 233 |

To 272 parts of the base resin was added 1630 parts of deionized water to yield a 10 percent solids electrodeposition bath with a ph of 6.7. Zinc phosphate steel panels were electrocoated at 250 volts for 90 seconds at 80°F. Uniform film build was noted. The film was baked at 350°F. for 30 minutes to yield a glossy film, 0.45 mils, pencil hardness 6H. Film electrocoated at 300 volts for 90 seconds at 80°F. and baked as above yielded 0.5 mils pencil hardness 6H.

To the same bath was added 6.6 parts of boric acid. The bath had a ph of 6.4. Film electrocoated and baked as above yielded:

| | |
|---|---|
| 250 volts | — 0.5 mils, 7H + pencil |
| 300 volts | — 0.6 mils, 7H + pencil |

Other reaction products can be formed and utilized in the foregoing invention using other epoxy compounds, amine, acids, salts and boron compounds as described above. Similarly, other conditions and adjuvants and the like may be employed to formulate and utilize the coating compositions as desired.

According to the provision of the Patent Statutes, there are described above the invention and what are now considered to be its best embodiments. However, within the scope of the appended claims, it is to be understood that the invention can be practiced otherwise than as specifically described.

We claim:

1. An aqueous dispersion comprising
   a. an ungelled water-dispersed epoxy resin, having in the resin molecule at least one 1,2 epoxy group, at least about 0.05 percent by weight of chemically-bound nitrogen in the form of a quaternary ammonium base salt of an acid having a dissociation constant greater than $1 \times 10^{-5}$, and
   b. boric acid said dispersion containing sufficient boron to catalyze the cure of a film of said epoxy resin.

2. An aqueous dispersion as in claim 1 whrein at least about 20 percent of the nitrogen in said epoxy resin is in the form of quaternary ammonium base salt groups.

3. An aqueous dispersion as in claim 2 wherein at least about 50 percent of the nitrogen in said epoxy resin is in the form of quaternary ammonium base salt groups.

4. A resin as in claim 2 wherein substantially all of the nitrogen in said epoxy resin is in the form of quaternary ammonium base salt groups.

5. An aqueous dispersion as in claim 1 wherein the acid is an organic carboxylic acid.

6. An aqueous dispersion as in claim 5 wherein at least about 20 percent of the nitrogen in said epoxy resin is in the form of quaternary ammonium base salt groups.

7. An aqueous dispersion as in claim 6 wherein at least about 50 percent of the nitrogen in said epoxy resin is in the form of quaternary ammonium base salt groups.

8. An aqueous dispersion as in claim 7 wherein substantially all of the nitrogen in said epoxy resin is in the form of quaternary ammonium base salt groups.

9. An aqueous dispersion as in claim 1 wherein the acid is lactic acid.

10. An aqueous dispersion as in claim 1 wherein the acid salt is in the form of an internal zwitterion.

11. An aqueous dispersion as in claim 9 wherein at least about 20 percent of the nitrogen in said epoxy resin is in the form of quaternary ammonium base salt groups.

12. An aqueous dispersion as in claim 9 wherein at least about 50 percent of the nitrogen in said epoxy resin is in the form of quaternary ammonium base salt groups.

13. An aqueous dispersion as in claim 9 wherein substantially all of the nitrogen in said epoxy resin is in the form of quaternary ammonium base salt groups.

14. An aqueous dispersion as in claim 1 wherein said epoxy resin is derived from a polyglycidyl ether of a polyphenol.

15. An aqueous dispersion as in claim 1 wherein said epoxy resin is derived from a polyglycidyl ether of bis(-4-hydroxyphenyl)-2,2-propane.

16. An aqueous dispersion as in claim 1 wherein said epoxy resin contains about .05 to about 16 percent by weight of nitrogen.

17. An aqueous dispersion as in claim 1 wherein said aqueous dispersion contains sufficient boron to provide from 0.01 to about 8 percent boron in a film of said epoxy resin.

18. An aqueous dispersion as in claim 1 wherein said epoxy resin contains oxyalkyene groups.

19. An aqueous dispersion as in claim 1 wherein said quaternary ammonium base salt is derived from a tertiary amine salt of an organic acid.

20. An aqueous dispersion as in claim 19 wherein said quaternary ammonium base salt is derived from salt of a hydroxyl amine.

21. An aqueous dispersion as in claim 1 wherein said quaternary ammonium base salt is derived from dimethylethanol amine lactate.

22. An aqueous electrodeposition bath which comprises an aqueous dispersion comprising:
a. an ungelled water-dispersed epoxy resin having in the resin molecule at least one 1,2 epoxy group, at least about 0.05 percent by weight of chemically-bound nitrogen in the form of a quaternary ammonium base salt group of an acid having a dissociation constant greater than $1 \times 10^{-5}$, said quaternary ammonium base salt group having been derived from a tertiary amine salt of an organic acid, and b. boric acid said dispersion containing sufficient boron to catalyze the cure of a film of said epoxy resin.

23. An aqueous electrodeposition bath as in claim 22 which contains an organic coupling solvent.

24. An aqueous electrodeposition bath as in claim 23 wherein the coupling solvent comprises 2-ethylhexanol.

* * * * *

UNITED STATES PATENT OFFICE
CERTIFICATE OF CORRECTION

Patent No. 3,839,252          Dated October 1, 1974

Inventor(s) Joseph F. Bosso and Marco Wismer

It is certified that error appears in the above-identified patent and that said Letters Patent are hereby corrected as shown below:

The recitation of the inventors and their addresses should read:

-- Joseph F. Bosso, Lower Burrell, and Marco Wismer, Gibsonia, both of Pa. --.

Signed and sealed this 17th day of December 1974.

(SEAL)
Attest:

McCOY M. GIBSON JR.          C. MARSHALL DANN
   Attesting Officer            Commissioner of Patents